US012670083B2

(12) United States Patent
Besnainou

(10) Patent No.: US 12,670,083 B2
(45) Date of Patent: Jun. 30, 2026

(54) METHOD AND SYSTEM TO MONITOR THE OPERATION OF AN APPLICATION

(71) Applicant: BULL SAS, Les Clayes-sous-bois (FR)

(72) Inventor: Jérôme Besnainou, Eaubonne (FR)

(73) Assignee: BULL SAS, Les Clayes-sous-Bois (FR)

( * ) Notice: Subject to any disclaimer, the term of this patent is extended or adjusted under 35 U.S.C. 154(b) by 251 days.

(21) Appl. No.: 18/605,504

(22) Filed: Mar. 14, 2024

(65) Prior Publication Data

US 2024/0311270 A1     Sep. 19, 2024

(30) Foreign Application Priority Data

Mar. 16, 2023     (EP) ..................................... 23305362

(51) Int. Cl.
G06F 11/34          (2006.01)
(52) U.S. Cl.
CPC ................................. G06F 11/3466 (2013.01)
(58) Field of Classification Search
USPC .......................................................... 717/127
See application file for complete search history.

(56) References Cited

U.S. PATENT DOCUMENTS

| | | | | |
|---|---|---|---|---|
| 10,956,255 B1 * | 3/2021 | Al-Bahar | ................ | G06F 40/35 |
| 11,249,836 B2 * | 2/2022 | Al-Bahar | ............ | G06F 11/0793 |
| 11,929,963 B1 * | 3/2024 | Zheng | ........................ | G06F 8/77 |
| 2005/0182582 A1 | 8/2005 | Chen | | |
| 2013/0031094 A1 | 1/2013 | Kozak | | |
| 2014/0101420 A1 * | 4/2014 | Wu | ........................ | G06F 1/3206 |
| | | | | 713/1 |

| | | | | |
|---|---|---|---|---|
| 2019/0102213 A1 * | 4/2019 | Yousaf | ................ | G06F 11/3072 |
| 2021/0141709 A1 * | 5/2021 | Richardson | ......... | G06F 11/3452 |
| 2021/0294818 A1 | 9/2021 | Savalle et al. | | |
| 2022/0345387 A1 * | 10/2022 | Ehrlich | ................ | H04L 41/142 |

(Continued)

FOREIGN PATENT DOCUMENTS

| | | |
|---|---|---|
| EP | 0915422 A1 | 5/1999 |

OTHER PUBLICATIONS

Du et al., "DeepLog: Anomaly Detection and Diagnosis from System Logs through Deep Learning," ACM, 2017. (Year: 2017).*

(Continued)

*Primary Examiner* — Ryan D. Coyer
(74) *Attorney, Agent, or Firm* — ARC IP Law, PC; Joseph J. Mayo

(57)          ABSTRACT

The invention relates to a method for monitoring the operation of an application, including acquiring data that has a plurality of key performance indicators related to the current operation of the application; determining, based on the acquired data, forecasted data that includes a plurality of key performance indicators related to a future operation of the application; automatically scheduling a monitoring session targeting at least one component of the application corresponding to a group of key performance indicators, the group of key performance indicators including each key performance indicator of the forecasted data having a value moving away from a corresponding predefined value range being associated with a normal operation of the application; obtaining, from a user, using a conversational agent, information related to an anomalous behavior of the application; and modifying the scheduled monitoring session based on the obtained information.

10 Claims, 1 Drawing Sheet

(56)            References Cited

U.S. PATENT DOCUMENTS

2022/0414187 A1 *   12/2022   Seck ................... G06F 11/3093
2023/0105304 A1 *   4/2023   Mandal ............... G06F 18/2415
                                          714/37

OTHER PUBLICATIONS

Currie et al., "Using Correlations for Application Monitoring in Cloud Computing," IEEE, 2017. (Year: 2017).*

Lan et al., "Toward Automated Anomaly Identification in Large-Scale Systems," IEEE, 2010. (Year: 2010).*

Yu et al., "KPI anomaly detection method of AIOps based on GAN," SPIE, 2023. (Year: 2023).*

Zhang et al., "A Real-time, Scalable Monitoring and User Analytics Solution for Microservices-based Software Applications," IEEE, 2022. (Year: 2022).*

European Search Report and Written Opinion issued in EP23305362.8 issued on Aug. 23, 2023 (14 pages).

Ehlers, et al., "Self-Adaptive Software System Monitoring for Performance Anomaly Localization", Proceedings of the 8th ACM International Conference on Autonomic Computing; Jan. 1, 2011.

* cited by examiner

METHOD AND SYSTEM TO MONITOR THE OPERATION OF AN APPLICATION

This application claims priority to European Patent Application Number 23305362.8, filed 16 Mar. 2023, the specification of which is hereby incorporated herein by reference.

BACKGROUND OF THE INVENTION

Field of the Invention

The domain of at least one embodiment of the invention is the one of the monitoring of applications, and especially of the monitoring of the operation of applications.

At least one embodiment of the invention relates to a method for monitoring the operation of an application. It further relates to a system configured to carry out the monitoring method and a corresponding computer program and computer-readable medium.

Description of the Related Art

An application, also known as application software, is a program running on a computer, that is reachable by users through an interface and that provides services to these users. The services provided could be of many types, for example filling a form, performing a computation, or even booking a hotel.

To run such an application, the computer usually comprises computing resources, such as processing units and high speed memories, and storage resources, such as a hard drive or the like. The computer is usually a server having a network interface connected to a network such as the internet, through which it communicates with a user device, such as a laptop or a mobile phone, sending requests to the server to get access to the services provided by the application.

To monitor an application, a specific team of human IT operators and/or software developers (also called "devops teams") usually investigates different components of the application and/or of the server, to determine if any issue is occurring and mitigate this issue by, for example, applying a patch.

Systems called "monitoring systems" can also be used. Monitoring systems are configured to monitor the operation of applications to raise an alert when an issue is detected, what allows the devops team to focus on mitigating the issues detected. However, such monitoring systems apply a purely reactive approach to incidents, that is an approach proposing solutions for incidents that have already occurred. None of the existing monitoring systems tries to anticipate incidents, which leads to a suboptimal monitoring.

Therefore, there is a need to optimize the monitoring of the operation of an application.

BRIEF SUMMARY OF THE INVENTION

At least one embodiment of the invention provides a solution to the given problems by providing a system combining both a reactive approach and a predictive approach to monitor efficiently an application.

For this purpose, one or more embodiments of the invention concerns a method for monitoring the operation of an application, comprising:

acquiring data comprising a plurality of key performance indicators related to the current operation of the application;

determining, based on the acquired data, forecasted data comprising a plurality of key performance indicators related to a future operation of the application;

automatically scheduling a monitoring session targeting at least one component of the application corresponding to a group of key performance indicators, the group of key performance indicators comprising each key performance indicator of the forecasted data having a value moving away from a corresponding predefined value range being associated with a normal operation of the application;

obtaining, from a user, using a conversational agent, information related to an anomalous behavior of the application;

modifying said scheduled monitoring session based on the obtained information.

A key performance indicator, or KPI, is an indicator corresponding to a performance level of the application regarding one metric. By "metric" is meant any relevant measurable quantity to evaluate the activity of the application. Said performance indicator can be for example a waiting time or a number of users using the application simultaneously.

A future operation of the application is an operation of the application at a later time compared to the current time i.e. the time at which the acquisition of data is realized.

A component of the application is a software or a hardware component comprised in and/or used by the application. It can be for example a computing algorithm or a memory.

A value moving away from a predefined value range is a value that deviates from the predefined value range. Preferably, the value moving away from a predefined value range is a value that is out of the predefined value range.

A normal operation of the application is the operation of the application that is expected by a user and/or a devops team.

An anomalous behavior of the application is an operation of the application deviating from the normal operation of the application, that is experienced by the user.

A monitoring session is a session wherein KPIs most likely to become problematic are investigated by a devops team. Scheduling monitoring sessions from forecasts of the future KPIs of the application allows to anticipate issues before they occur, which corresponds to a predictive approach of the monitoring. Actually, each monitoring session focuses on the components of the application whose forecasted operation is the worst, that is the farthest from the corresponding expected range of values.

Modifying the monitoring session scheduling based on feedbacks from users allows to fix issues that have a significant impact on the user experience first. It corresponds to a reactive approach of monitoring and allows to improve the purely predictive monitoring approach that could miss issues that the users can spot more easily.

Therefore, combining both predictive and reactive approaches allows to improve the monitoring of the application by keeping an eye on urgent issues having an immediate impact on the application while identifying and monitoring components of the application that are most likely to encounter a problem in the near future.

According to at least one embodiment of the method, said scheduled monitoring session is associated with:

a scheduling monitoring date, by which the monitoring session has to be completed; and/or each component of the application that is targeted by the scheduled monitoring session.

Said scheduled monitoring session can further by associated with a description of a task to perform and/or a goal to reach.

According to at least one embodiment, the modification of said scheduled monitoring session comprises modifying the scheduling monitoring date and/or at least one component associated with the scheduled monitoring session. It can also comprise modifying the description of the operation to perform or/and the goal to reach if applicable.

According to at least one embodiment of the method, the obtention of the information comprises asking by the conversational agent, at least one question to the user and receiving by the conversational agent, at least one answer from the user to each question asked, the information being extracted from each answer received from the user.

According to at least one embodiment, the obtention of the information comprises detecting, using the conversational agent, a mood of the user, and the modification of the scheduled monitoring session is further based on the mood detected.

According to at least one embodiment of the method, each scheduled monitoring session is associated with a list of keywords linked to the corresponding targeted component.

According to at least one embodiment, the method further comprises analyzing the obtained information to get a list of keywords, the scheduled monitoring session to be modified being the one having the most keywords in common with the information.

According to one or more embodiments, the method comprises clustering the scheduled monitoring session to be modified with another scheduled monitoring session having keywords in common with the scheduled monitoring session to be modified. The other scheduled monitoring session has preferably a scheduled monitoring date within a predefined timeframe such as the next day or the next week.

According to at least one embodiment of the method, the forecasted data is determined over a predetermined period of time.

According to at least one embodiment of the method, the forecasted data is determined by a machine learning algorithm trained to predict data related to the operation of the application at a given instant from data related to the operation of the application at an instant preceding the given instant.

According to one or more embodiments, the machine learning algorithm is trained in a supervised way using a training database, the training database comprising a history of data related to the operation of the application.

At least one embodiment of the invention also concerns a system configured to execute the method according to one or more embodiments of the invention, comprising a conversational agent.

At least one embodiment of the invention concerns a computer program comprising instructions which, when the program is executed by the system according to at least one embodiment of the invention, cause the system according to one or more embodiments of the invention to carry out the method according to the invention.

At least one embodiment of the invention concerns a computer-readable medium comprising instructions which, when executed by the system according to at least one embodiment of the invention, cause the system according to one or more embodiments of the invention to carry out the method according to one or more embodiments of the invention.

At least one embodiment of the invention and its various applications will be better understood upon reading the following description and examining the accompanying figures.

BRIEF DESCRIPTION OF THE DRAWINGS

The figures are presented as an indication and in no way limit the one or more embodiments of the invention.

DETAILED DESCRIPTION OF THE INVENTION

Figures 1, 2:
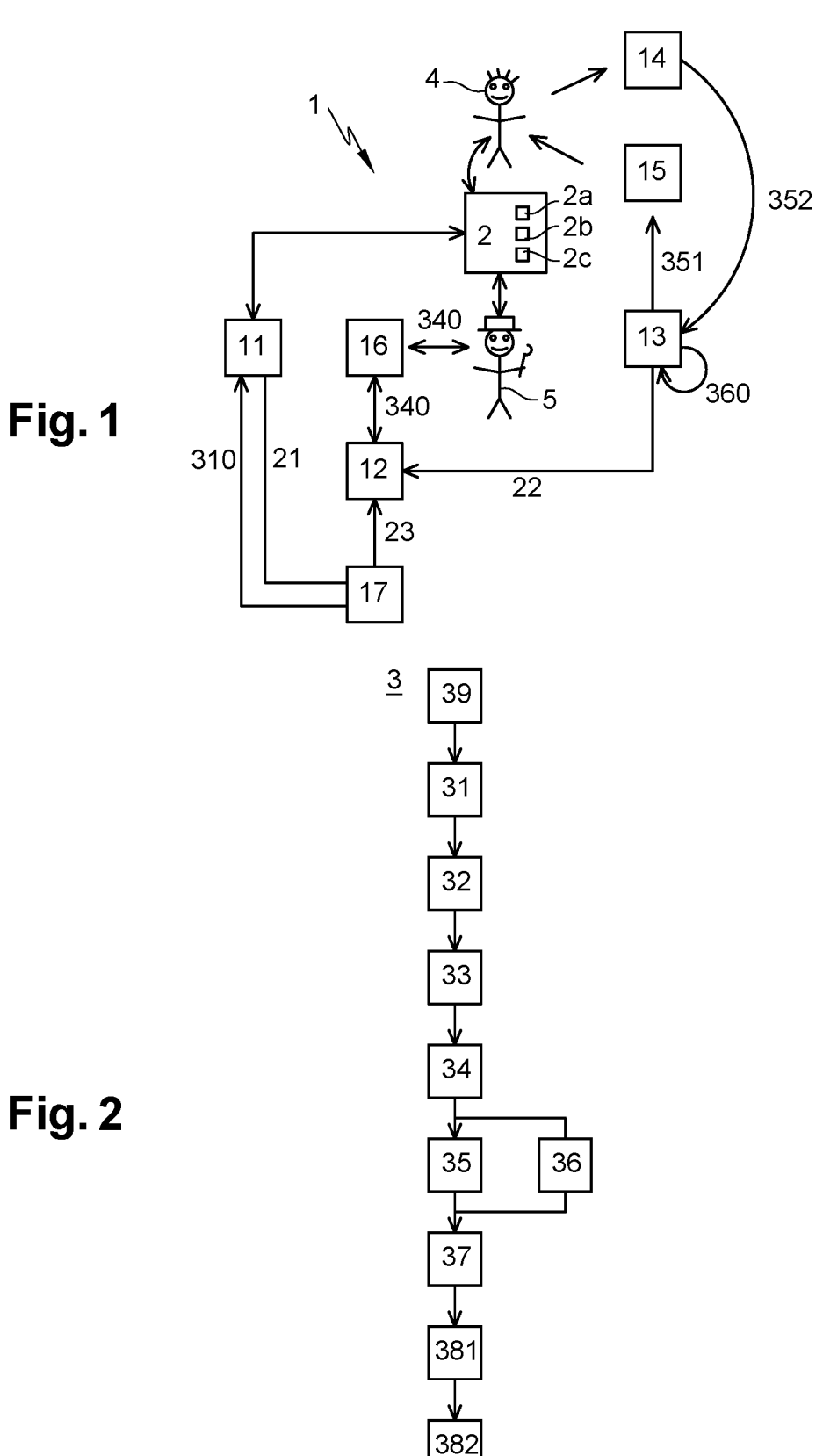
FIG. 1 shows a system according to at least one embodiment of the invention that is configured to implement a method according to one or more embodiments of the invention.
FIG. 2 shows the method according to one or more embodiments of the invention.

At least one embodiment of the invention relates to a method for monitoring the operation of an application, and to a system configured to carry out such a method.

FIG. 1 shows the system 1 according to at least one embodiment of the invention that is configured to implement the method 3 according to one or more embodiments of the invention.

The monitored application 2 is for example a web-based application or a cloud application.

The monitored application 2 can comprise components 2a, 2b, 2c that provide different functions or services within the application 2.

The monitored application 2 is intended to be used by one user 4 or a plurality of users 4. Users 4 can access the application 2 through an interface, for example a web interface.

The monitored application 2 is for example running on a server comprising computing resources. The computing resources can for example comprise a computing processing unit (CPU), a high-speed memory such as random-access memory, a storage device, and a bus configured to interconnect these elements. The computing resources can also comprise a network interface to connect to a network such as a company's network or the internet.

The monitored application 2 has a state that is continuously evolving depending on many parameters, such as the number or the complexity of tasks that are performed by, or the number of users 4 connected to the application 2.

The monitored application 2 is preferably managed by a team 5 of experts in charge of maintaining the application 2. The team 5 of experts can comprise information technology operators, said "IT operators" or "operators", and/or software developers, said "developers". This kind of team is called a "devops team". The devops team 5 can work on components 2a, 2b, 2c of the application 2 whatever it is a software component or a hardware component (such as a resource of the server the application 2 is running on).

The monitoring method 3 schedules and manages monitoring sessions 340 that are sent to the devops team 5. Monitoring sessions 340 defines a work that has to be performed on at least a component 2a, 2b, 2c of the application 2. Each scheduled monitoring session 340 comprises at least a scheduling monitoring session date (or "scheduling date") at which the monitoring session has to be completed, and/or one or several components 2a, 2b, 2c of the application 2, that are targeted by the scheduled monitoring session 340. The monitoring session 340 can also comprise a description of the task to perform and even a goal
to reach, for example "increasing the memory size by 1 Tb".

In at least one embodiment, for example shown in FIG. 1,
the system 1 comprises a dashboard 16. The dashboard 16 is
populated with monitoring sessions 340 which are scheduled
by the monitoring method 3. A member of the devops team
5 can consult, for example every morning, the dashboard 16
that aggregates the monitoring sessions 340 scheduled for
the next few hours or next few days, and can dispatch the
monitoring sessions 340 between members of the devops
team 5. Alternatively, an algorithm can be used for the
dispatch of the monitoring sessions 340 between the mem-
bers of the devops team 5. To do so, the algorithm can for
example use the schedule of each member of the devops
team 5. The algorithm can for example notify each morning
the members of the devops team 5 having to realize a
monitoring session 340 in the daytime.

The system 1 can comprise means such as a computer, a
server or a microcontroller to carry out some steps of the
method 3 that are computer-implemented. "Computer-
implemented" means that the steps, or at least one step, are
performed by at least one computer, processor or other
similar system. Thus, steps are carried out by a calculator,
possibly fully automatically or semi-automatically. For
example, at least some of the steps of the method can be
triggered by a user-computer interaction. The level of user-
computer interaction required may depend on the level of
automation planned and balanced against the need to imple-
ment the user's needs. For example, this level can be
user-defined and/or predefined.

The steps of the method are typically executed with a
computer adapted for this purpose. The computer may
comprise a processor coupled to a memory, a graphical user
interface ("GUI") and/or an audio interface, a computer
program including instructions for implementing the steps of
the method being stored on the memory. The memory can
also store a database. The memory is any hardware suitable
for such storage, possibly comprising several distinct physi-
cal parts.

In FIG. 1, by way of at least one embodiment, the system
1 comprises a monitoring session scheduler 12 also called
"session scheduler" or "scheduler". It can be a computer or
a computer implemented software that is configured to
schedule monitoring sessions 340. For example, it is con-
figured to populate the dashboard 16 with monitoring ses-
sions 340 and eventually to dispatch the monitoring sessions
340 between the members of the devops team 5.

The system 1 can further comprise a machine learning
algorithm 17 also called "predictive agent", which can be
configured to predict a future state of the application 2. The
predictive agent 17 can be trained 39 to predict the fore-
casted data 23 in a way discussed below.

The system 1 can further comprise at least one probe 11.
A probe 11 can be a measurement device, such an electrical
power meter, to measure the electrical power used by the
resources running the application 2. It can also be a software
agent that operates autonomously and that can be called
"micro-application", "performance measurement agent",
"applet" if it is on the side of the application 2 or "servlet"
if it is on the side of the server running the application. The
probes 11 can operate autonomously and can acquire data of
the operation of the application 2 such as a performance
level of the running application 2 or of the server on which
the application 2 is running. Performance level can be a
power consumption of the CPU or a memory usage of the
application 2, or a performance level of the application 2,
such as a number of tasks performed, or a waiting time, or a number of users 4 connected to the application 2. A probe
11 can also be an electronic device connected, by a bus or
a network, to an acquisition unit which can also belong to the
system 1. The probes 11 can perform a measurement fol-
lowing a request from the predictive agent 17.

The system 1 comprises a conversational agent 13 con-
figured to interact with a user 4 in a way that looks like (or
resembles) a discussion with a human operator. The con-
versational agent 13 can be called "chatbot" or "callbot"
depending on whether the discussion is text-based or voice-
based. The conversational agent 13 can be a computer
program or an electronic device (such as a controller).

The system 1 can comprise an input interface 15 and an
output interface 14. The conversation agent 13 can be
configured to interact with the user 4 by means of the input
and output interfaces 15, 14. The output interface 14 is, for
example, a graphical user interface or a speaker. The input
interface 15 is, for example, a keyboard, a touchscreen or a
microphone. If the conversational agent 13 is a chatbot, the
output interface 14 is preferably a screen, and the input
interface 15 is preferably a keyboard and/or a mouse. If the
conversational agent 13 is a callbot, the output interface 14
is preferably a speaker, and the input interface 15 is pref-
erably a microphone (both can be parts of a phone).

FIG. 2 shows the monitoring method 3 according to one
or more embodiments of the invention. The method 3 can be
implemented to populate the dashboard 16 with monitoring
sessions 340. The method 3 can also be used to reschedule
the monitoring sessions 340 to prioritize a more urgent one.
The method 3 permits to improve the monitoring of the
operation of the application 2. The method combines two
approaches to monitor the operation of the application 2: a
predictive approach and a reactive approach. The predictive
approach is implemented from the forecast of data 23 related
to the future operation of the application 2 in order to detect
a negative evolution of the state of the application 2 which
could lead to an issue. The reactive approach is intended to
detect incidents that have already occurred and that have not
been forecasted or cannot be forecasted via the predictive
approach.

During its operation, the application 2 has a state that is
continuously evolving, due to the number and the complex-
ity of tasks it has to deal with. The method 3 comprises
acquiring 31 at a first time, data 21 of the current operation
of the application 2. The acquisition 31 can be performed by
the probes 11. The acquisition can be requested 310 by the
predictive agent 17 which receives back the acquired data 21
from the probes 11. The acquired data 21 is a snapshot of the
state of the application 2 at the first time. It is also the
starting point of the predictive approach of the monitoring
method 3.

The acquired data 21 comprise a plurality of key perfor-
mance indicators (KPIs). A KPI is a measurable quantity that
provides an overview of the performance of the application
2 during its operation. A KPI can correspond to a quantity
that the users 4 might directly or indirectly perceive, such as
a loading time, or a computing time. A KPI can also
correspond to a value the devops team 5 is interested in. For
example, the KPI can be an energy consumption, a waiting
time, or a load of computing resources. It can also be a
number of users 4 connected to the application 2.

The method 3 comprises determining 32 forecasted data
23 of the operation of the application 2. The determination
32 is performed based on the acquired data 21. Forecasted
data 23 is data related to a future state of the application 2
that the application 2 might find itself in. Said future state of
the application 2 is determined from the acquired data 21 which is related to the current state of the application 2. Forecasted data 23 also comprises a plurality of KPIs. Therefore, the forecasted KPIs are determined from the KPIs of the acquired data 21.

The predictive agent 17 is preferably configured to perform the determination 32 of the forecasted data 23 and the associated KPIs from the acquired data 21. For example, it is configured to forecast, from the acquired data 21 and the related KPIs, the future state of the application 2 and compute the forecasted data 23 and the related KPIs. To perform the determination 32, the predictive agent 17 can be trained 39 beforehand on training data using a machine learning method such as a supervised learning method or a reinforced learning method.

The training data comprises for example a history of data 21 related to the operation of the application 2, that is data 21 related to the operation of the application 2 for a plurality of instants preceding the current instant. The predictive agent 17 is then trained to predict the data related to the operation of the application at a given instant of the plurality of instants from the data of the history of data related to the operation of the application at an instant of the plurality of instants preceding the given instant.

The history of acquired data 21 can be acquired during previous uses of the application 2. The training data can be updated periodically with newly acquired data 21 and associated KPIs. It allows to keep training 39 the predictive agent 17 to improve its behavior and the precision of the forecast data 23 of the application 2.

The predictive agent 17 is for example DeepAR™.

The method 3 comprises automatically scheduling 34 a monitoring session 340. Such a scheduling 34 can be done with the information the scheduler 12 can access. For example, the predictive agent 17 can transmit the forecasted data 23 and the related KPIs to the scheduler 12. The scheduler 12 can schedule 34 a monitoring session 340 based on the KPIs of the forecasted data 23. The monitoring session 340 can be sent to the dashboard 16. This way, the devops team 5 is also able to access the dashboard 16 and the scheduled monitoring session 340.

The scheduling 34 is performed based on the KPIs of the forecasted data 23. A predefined value range can be expected from a KPI. Said predefined value range is preferably associated with a normal behavior of the application 2. Normal behavior means an operation of the application 2 that is expected. It can also be understood as a behavior without issue. For example, if the KPI is a load of the computing resources, the predefined value range could extend from 0% of a maximum load to 80% of said maximum load. Therefore, when the KPI gets out of the expected value range [0%; 80%], for example because it reaches 90% of said maximum load, the operation of the application is having an issue. The users 4 might also perceive the application 2 as having a slowdown. By "expected value range" is meant a predefined or predetermined range of values for a KPI. The range can be predefined or predetermined by the devops team 5 which sets the boundaries of the range regarding values of the KPI that are expected. It can correspond to a behavior of the application 2 that is expected by the devops team 5.

Forecasted data 23 comprise a plurality of KPIs. Each KPI can be associated with an expected value range. Alternatively, a unique value range can be considered and, in this case, a function of the KPIs such as a linear combination of the KPIs will be compared against the unique value range.

The KPIs of the forecasted data 23 are related to a future operation of the application 2. By comparing each KPI of the forecasted data 23 to a predefined value range, it will allow to detect a future operation of the application 2 that is not expected and thus is having an issue. For example, the scheduler 12 determines 33 a group of KPIs that are out of the associated value ranges. The determination 33 also comprises determining at least one component of the application that is related to a KPI from the group of out-of-range KPIs.

The forecasted data 23 are related to a future operation of the application 2. In other words, it corresponds to an operation of the application 2 at a future time. Said future time is preferably constraint within a predefined period of time (or timeframe). The period of time to consider can extend to the next few hours to the next few days. Indeed, it may not be relevant to perform a prediction over a larger period of time. It may involve a greater computation time and/or larger computing resources.

The determination 32 of the forecasted data 23 can be performed a plurality of times, for example periodically. Therefore, there is no need to consider a large period of time between two data determination 32. The time period between two iterations of the determination 32 is preferably enough to obtain a state of the application 2 without an incident and a subsequent state of the application 2 with an incident. The time period is, for example, smaller than a month or smaller than a week, such as a day. In order to reduce the computation time, the time periods considered are not consecutive. Indeed, depending on the velocity of the evolution of the state of the application 2, there is a low chance of a major incident occurring just after a period for which forecasted data 23 and the corresponding out-of-range KPIs have yet been determined 33. Moreover, for the same reasons, the time period considered can be focused on a period wherein the application 2 is strongly used and can have a higher chance to exhibits issues. For example, if the determination 32 of the forecasted data 23 is performed every morning at 6 am, the time period considered by the predictive agent 17 can range from 8 am to 11 pm. This could be the case if the evolution of the state of the application 2 is slow between 6 am and 8 am wherein only few users 4 are connected to the application 2. This could also be the case if, after 11 pm, there is fewer chance users 4 are connected to the application 2.

The predictive approach can anticipate incidents before they occur and the reactive approach can detect incidents that are occurring. It provides an adaptive and dynamic way to manage monitoring sessions.

The method comprises a step of obtaining 35 information 22 on the current state of the application 2. The obtention 35 can be subsequent to the acquisition 31 of the acquired data 21 but not necessarily consecutive.

A user 4 experiencing an incident or detecting an abnormal behavior of the application 2 can send a request to the conversational agent 13, for example by means of the input interface 14. An example of a conversational agent 13 as a callbot is detailed below, however it is transposable to a chatbot or any other type of conversational agent.

When the user 4 experiences an issue with the application 2, it sends a request which is received by the callbot 13. For example, the user 4 can call at a predefined phone number or using a callbot service. The callbot 13 asks, at least one question 351 to the user 4. For example, said question 351 is asked to the user 4, using the output interface 15 (such as a speaker of a phone). In other words, it asks for details to the user 4. The callbot 4 then waits to receive at least one answer 351 from the user 4. The answer 352 can be received by recording, by means of a microphone 14, the answer 352 from the user 4.

The information 22 related to the anomalous behavior of the application 2 is extracted from the answers 352 given by the user 4. For example, the conversational agent 13 can implement a transcription of said answers 352 into a text. A transcription of the questions 351 asked can also be incorporated into the information 22 obtained. When an answer 352 is given over a textual discussion, the conversational agent 13 may not need to transcribe the answer 352 received.

To help digging the incident or the behavior of the application 2, a plurality of questions 351 can be asked at a same time and a plurality of answers 352 can be received in response. The monitoring method 3 can also comprise analyzing each answer 352 received from the user 4, preferably in the context of the related question 351 asked, to ask another question 351 to the user 4. A supplementary answer 352 can be received (for example recorded) the same way as the previous answers 352. Previous answers 352 analysis to send supplementary questions 351 and receive supplementary answers 352 can be performed multiple times. The analysis of the answers 352 is preferably performed by the conversational agent 13. For example, the conversational agent 13 is configured to search for predetermined keywords in a text or an audio source and generate a corresponding question 351.

The information 22 obtained can comprise a description of the abnormal behavior of the application 2 observed by the user 4. From this description, a list of keywords related to one or more components 2a, 2b, 2c of the application 2 can be extracted. Those keywords can be determined by the conversational agent 13 while obtaining the information 22 from the user 4. They can help the conversational agent 13 to ask relevant questions 351 to the user 4 and dig deeper into the incident experienced. Alternatively, the list of keywords can be determined by another component such as the scheduler 12.

The method 3 can also comprise, using the conversational agent 13, detecting 36 a mood 360 of the user 4 when the user 4 is answering a question 351. It can be performed simultaneously with the obtention of the information 22. For example, when the answer is given using a microphone, the mood 360 can be detected from a speed of the voice, a sound level of the voice or a vocabulary used. When the answer is typed on a keyboard, the mood 360 can be detected from the vocabulary used or a density of errors per word. The mood 360, such as stress or angriness, can help to determine the impact level of the issue on the user experience. The information 22 can comprise said mood 360. The detection 36 of moods 360 can also be performed after the obtention 35 of the information 22 from the user 4. The mood 360 is therefore detected 36 from the information 22 acquired.

After being acquired, the information 22 are then transmitted to the scheduler 12. Upon reception of the information 22, at least one of the scheduled monitoring sessions 340 is modified 37 by the scheduler 12 thanks to the information 22.

Each scheduled monitoring session 340 is associated to a component 2a, 2b, 2c that is targeted by said monitoring session 340. An analysis can be performed to extract a list of keywords linked to components 2a, 2b, 2c that are targeted by the monitoring session 340. This list of keywords is compared to the list of keywords of the information 22 obtained from the user 4. The monitoring session 340 to be modified is the one having the most keywords in common with the information 22.

Before performing the comparison, the analysis performed on the monitoring session 340 to obtained the list of keywords can be performed by the same device, the same way, on the information 22.

The modification 37 of the monitoring session 340 can comprise:
modifying the scheduling monitoring date; and/or
modifying at least one component that is targeted by the monitoring session 340.
It can also comprise, when available:
modifying the description of the operation to perform; and/or
modifying the goal to reach.

The modified monitoring session 340 is, for example, moved forward or delayed depending on the information 22 given by the user 4. For example, if the user 4 reaching the callbot 13 described a component 2a, 2b, 2c of the application 2 that is misbehaving, the monitoring session 340 targeting said component will be moved forward so the devops team 5 can fix the issue sooner. Information 22 acquired from the user 4, for example comprising the mood 360, can also be included to the monitoring session 340.

When no monitoring session addressing the designated component is scheduled yet, the monitoring method 3 can comprise scheduling a new monitoring session 340 based on the information 22 obtained from the user 4. The said new monitoring session preferably comprises the same kind of information as the monitoring session discussed above. This way, if the predictive side of the method 3 missed an issue that might occur, it can be detected and reported by a user 4 and fixed by the devops team 5.

The modification 37 is preferably performed if the information 22 are obtained before the scheduling date of the monitoring session 340 to modify. A smaller timeframe can eventually be considered in order not to modify a monitoring session 340 that is yet handled by the devops team 5. For example, the modification is performed if the information 22 are obtained before a predefined time before the scheduling data of the scheduled monitoring session 340. The predefined time can be one hour, twelve hours or one day.

The method can also comprise clustering 381 a scheduled monitoring session 340 with at least another monitoring session 340, such as another one stored in the dashboard 16. The clustering 381 can be performed using the list of keywords previously obtained. The monitoring sessions 340 are clustered following, for example, keywords that are in the list of keywords. The clustering 381 can also be performed with monitoring sessions that are scheduled within a predefined timeframe. Said timeframe is for example the next few days, the next week or the next month. It can be predefined by the devops team 5. It prevents considering monitoring session 340 that are scheduled on a longer term and that may not be relevant.

Monitoring sessions 340 that are clustered together can lack some information. To remedy, the method 3 can further comprise enriching 382 the monitoring sessions 340 that are clustered together, for example by sharing information from the different sessions 340. For example, if one monitoring session 340 comprises information obtained from a user, the information can be copied into the other monitoring sessions 340 of the cluster. Parts from the other monitoring sessions of the cluster can also be copied in the monitoring session 340. The enrichment 381 may be performed considering monitoring sessions that are scheduled within the same predefined timeframe as the clustering 381.

In FIG. 2, the clustering 381 and the enrichment 382 are performed after the monitoring session 340 are modified, by way of one or more embodiments. However, they can be performed before the modification as well. Moreover, they are not necessarily performed consecutively. They can even be performed at different times, for example the clustering 381 can be performed before the monitoring session 380 is modified and the enrichment 382 can be performed after.

The devops team 5 can consult the scheduled monitoring sessions 340, modified or not, in the dashboard 16, to get a good overview of the status of the application 2 and take the most efficient mitigation actions.

The invention claimed is:

1. A method for monitoring operation of an application, the method comprising:

acquiring data, said data comprising a plurality of key performance indicators related to a current operation of the application;

determining, based on the data that is acquired, forecasted data comprising a plurality of key performance indicators related to a future operation of the application;

automatically scheduling one or more monitoring sessions targeting at least one component of the application corresponding to a group of key performance indicators, the group of key performance indicators comprising each key performance indicator of the plurality of key performance indicators related to the future operation of the application of the forecasted data having a value moving away from a corresponding predefined value range being associated with a normal operation of the application, wherein each of said one or more monitoring sessions targeting said at least one component of the application is associated with a list of keywords linked to a corresponding targeted component of the at least one component;

obtaining, from a user, using a conversational agent, information related to an anomalous behavior of the application;

analyzing the information that is obtained from said user to get said list of keywords and identifying a monitoring session from said one or more monitoring sessions comprising a most keywords in common with said information;

modifying said monitoring session that is identified as comprising the most keywords in common with said information based on the information.

2. The method according to claim 1, wherein the monitoring session that is scheduled is associated with one or more of a scheduled monitoring date, by which the monitoring session has to be completed;

each component of said at least one component of the application that is targeted by the monitoring session that is scheduled;

wherein the modifying the monitoring session comprises modifying one or more of the scheduled monitoring date, at least one of said each component associated with the monitoring session.

3. The method according to claim 1, wherein the obtaining the information comprises asking by the conversational agent, at least one question to the user and receiving by the conversational agent, at least one answer from the user to each question of said at least one question that is asked, the information being extracted from each answer of said at least one answer that is received from the user.

4. The method according to claim 1, wherein the obtaining the information comprises detecting, using the conversational agent, a mood of the user, and the modifying the monitoring session is further based on the mood that is detected.

5. The method according to claim 1, wherein the forecasted data is determined over a predetermined period of time.

6. The method according to claim 1, wherein the forecasted data is determined by a machine learning algorithm trained to predict data related to the operation of the application at a given instant from data related to the operation of the application at an instant preceding the given instant.

7. The method according to claim 6, wherein the machine learning algorithm is trained in a supervised way using a training database, the training database comprising a history of data related to the operation of the application.

8. A system comprising:

a microcontroller, and a conversational agent;

wherein said system, via said microcontroller and said conversational agent, is configured to execute instructions for monitoring an operation of an application, comprising acquiring data, said data comprising a plurality of key performance indicators related to a current operation of the application;

determining, based on the data that is acquired, forecasted data comprising a plurality of key performance indicators related to a future operation of the application;

automatically scheduling one or more monitoring sessions targeting at least one component of the application corresponding to a group of key performance indicators, the group of key performance indicators comprising each key performance indicator of the plurality of key performance indicators related to the future operation of the application of the forecasted data having a value moving away from a corresponding predefined value range being associated with a normal operation of the application, wherein each of said one or more monitoring sessions targeting said at least one component of the application is associated with a list of keywords linked to a corresponding targeted component of the at least one component;

obtaining, from a user, using said conversational agent, information related to an anomalous behavior of the application;

analyzing the information that is obtained from said user to get said list of keywords and identifying a monitoring session from said one or more monitoring sessions comprising a most keywords in common with said information;

modifying said monitoring session that is identified as comprising the most keywords in common with said information based on the information.

9. The system of claim 8, wherein said system further comprises a non-transitory computer program comprising said instructions.

10. A non-transitory computer-readable medium comprising instructions which, when executed by a system, cause the system to carry out a method for monitoring operation of an application;

wherein said system comprises a non-transitory computer program, a microcontroller, and a conversational agent; and wherein said method comprises:

acquiring data, said data comprising a plurality of key performance indicators related to a current operation of the application;

determining, based on the data that is acquired, forecasted data comprising a plurality of key performance indicators related to a future operation of the application;

automatically scheduling one or more monitoring sessions targeting at least one component of the application corresponding to a group of key performance indicators, the group of key performance indicators comprising each key performance indicator of the plurality of key performance indicators related to the future operation of the application of the forecasted data having a value moving away from a corresponding predefined value range being associated with a normal operation of the application, wherein each of said one or more monitoring sessions targeting said at least one component of the application is associated with a list of keywords linked to a corresponding targeted component of the at least one component;

obtaining, from a user, using said conversational agent, information related to an anomalous behavior of the application;

analyzing the information to get said list of keywords and identifying a monitoring session from said one or more monitoring sessions comprising a most keywords in common with said information;

modifying said monitoring session that is identified as comprising the most keywords in common with said information based on the information.

\* \* \* \* \*